United States Patent

Gamberini et al.

[11] 4,279,079
[45] Jul. 21, 1981

[54] DIRECT FEELING GAGE FOR THE MEASUREMENT OF THE SIZES OF MOVING WORKPIECES, IN PARTICULAR FOR MEASUREMENTS WITH INTERMITTENT CONTACT BETWEEN THE FEELING MEANS AND THE WORKPIECE

[75] Inventors: Giorgio Gamberini, Pieve Di Cento; Giorgio Bozzoli, Corpo Di Reno, both of Italy

[73] Assignee: Finike Italiana Marposs S.p.A., S. Marino di Bentivoglio, Italy

[21] Appl. No.: 75,747

[22] Filed: Sep. 14, 1979

Related U.S. Application Data

[63] Continuation of Ser. No. 513,393, Oct. 9, 1974, abandoned.

[30] Foreign Application Priority Data

Oct. 25, 1973 [IT] Italy .................................. 3521 A/73

[51] Int. Cl.³ ............................................. G01B 7/12
[52] U.S. Cl. ................................. 33/149 J; 33/143 L; 33/174 L; 33/178 E
[58] Field of Search .............. 33/149 J, 143 L, 143 R, 33/147 K, 147 N, 174 L, 178 E, DIG. 5; 73/430

[56] References Cited

U.S. PATENT DOCUMENTS

| | | | |
|---|---|---|---|
| 3,123,943 | 3/1964 | Horsch et al. | 51/165 |
| 3,345,753 | 10/1967 | Giardino | 33/172 |
| 3,975,829 | 8/1976 | Possati | 33/169 R |

*Primary Examiner*—Willis Little
*Attorney, Agent, or Firm*—Stevens, Davis, Miller & Mosher

[57] ABSTRACT

A direct feeling gage for the measurement of the sizes of moving workpieces with intermittent contact between the feelers and the workpiece including a hollow cylindrical shell defining a fluid tight space adapted to house both a portion of a mobile arm to one end of which is attached feelers which supports a mobile element of a transducer and the transducer itself, the space being filled by a viscous fluid adapted to damp the mobile arm movement and being provided with sealable openings. The openings comprise fill holes, holes for the passage of the mobile arm and holes for the passage of electrical conductors connected to the transducer. The holes for the passage of the mobile arm being sealed through resilient gaskets.

9 Claims, 1 Drawing Figure

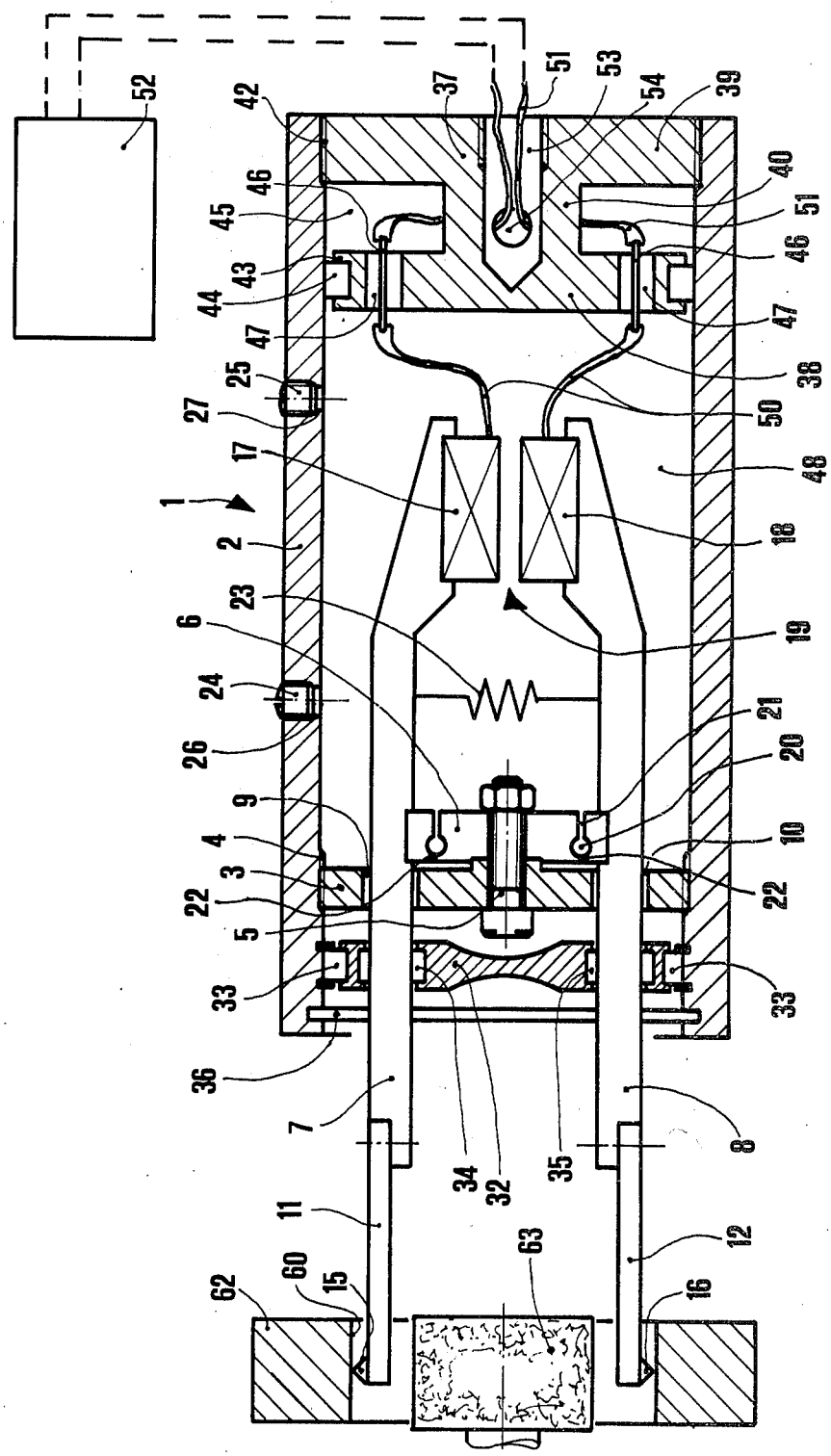

DIRECT FEELING GAGE FOR THE MEASUREMENT OF THE SIZES OF MOVING WORKPIECES, IN PARTICULAR FOR MEASUREMENTS WITH INTERMITTENT CONTACT BETWEEN THE FEELING MEANS AND THE WORKPIECE

This is a continuation of application Ser. No. 513,393 filed Oct. 9, 1974, now abandoned.

The present invention relates to a direct feeling gage adapted to measure the sizes of moving workpieces, for example during the machining on machine tools, such as grinders. More particularly, the invention relates to measurements during which, owing to the discontinuity of the workpieces surface or to the kind of machining, the feeling elements of the gage contact discontinuously the workpiece.

Gages adapted to measure moving workpieces with a discontinuous surface, such as splined shafts, reamers, etc., have been known for years. For example, in West German Pat. No. 1,303,814 there is described a gage provided with an hydraulic damper constituted by a cylinder and relative piston, which are connected between a point of a mobile arm carrying the feeler and the frame of the gage.

The damper limits the movement of the feeler when, in correspondence with a recess (for example, a groove), the feeler tends to fall into it, preventing or reducing in this way the bouncing of the feeler, due to the subsequent contact with the workpiece.

In the same patent there are described some electrical circuits suitable to detect the measure of those parts of the workpiece contacted by the feeler. These measures are obtained by processing the signals supplied by position transducers generating electrical signals that depend on the feeler position.

These known gages, though very efficient, sometimes present drawbacks and limits which do not allow their use or reduce their precision.

For example, during particular workings on machine tools, owing to the machine structure or to the shape and sizes of the workpiece, a very small space is available for the gage, so that the use of cylinders and hydraulic pistons, in order to obtain the damping, is not possible. Consequently the use of conventional gages is often impossible. In many other cases the mobile arms, due to inertiae or dimensions or accessibility of the parts to be measured, are relatively long and thin and therefore may easily bend, as the reaction force of the damper is localized. Moreover the damper undergoes hard stresses and may be damaged. Another drawback is the necessity of obtaining a very strong vacuum before filling the damper cylinder with the requested liquid (generally, a mineral oil), to prevent irregularity in the operation of the damper. Therefore special equipment and skilled operators are necessary to carry out these operations with the required accuracy.

It also is important to recognize that the filling of the damper with oil of different viscosity may be necessary not only in consequence of leaks, but also to vary the damping factor according to the machining.

It is therefore an object of the present invention to provide a direct feeling gage for the measurement of moving workpieces having damping means, which may be used under difficult conditions, for example in applications requiring a gage of very small dimensions.

Another object of the invention is to provide a gage with damping means for allowing easy variation of the damping factor in accordance with the different applications having damping forces that do not strain or stress the mobile elements, in order to avoid wrong measurements and damage to the gage.

Other objects and advantages will become apparent from the following description of a direct feeling gage for the measurement of moving workpieces. In particular, for measurements with intermittent contact between the feeling means and the workpiece, each feeling means is constituted by a feeler placed at one end of a mobile arm carrying a mobile element of at least a position transducer connected to an electrical unit for detecting the measure. The gage comprises, according to the invention, a hollow outer shell defining a fluid-tight space adapted to house both that part of the mobile arm which supports the mobile element of the transducer and the transducer itself. The space if filled by a viscous fluid adapted to damp the mobile arm movement and provided with sealed openings. The openings define filling holes, holes for the passage of the mobile arm and holes for the passage of electrical conductors connected to the transducer. The holes for the passage of the mobile arm are sealed through resilient gaskets.

BRIEF DESCRIPTION OF THE DRAWING

In the FIGURE, there is shown, partially sectioned, a gage for internal measurement.

DETAILED DESCRIPTION OF THE INVENTION

Referring to the drawing, a hollow cylindrical body 2 forms the outer shell of the measuring head 1 of the gage. A supporting element 3, disk-shaped with threaded edge, is screwed into internal thread 4 on shell 2.

A bar 6 is fixed to support 3 in diametral position by means of bolt 5. Two arms 7 and 8 are rigidly connected to the two ends of bar 6, passing through support 3 by way of two holes 9 and 10 in support 3.

The two arms 7 and 8 projecting out of shell 2 have attached to them small arms 11, 12 which carry feelers 15 and 16.

The other ends of arms 7 and 8 support two elements 17 and 18 of an electric measuring transducer 19.

Holes 20 and cuts 21 are made on bar 6, near the two ends, to reduce the section to a thin elastic lamina 22 which works as a fulcrum. In this way arms 7 and 8, integral with the ends of bar 6, can rotate slightly around these fulcra.

A return spring 23 is stretched between arms 7 and 8. Two screws 24 and 25 seal two through-holes 26 and 27 made on shell 2.

In the front part of shell 2 there is a circular plate 32, with which gaskets 33, 34 and 35 cooperate to seal with the internal wall of shell 2 the two arms 7 and 8 respectively.

An outer membrane 36 works substantially as a mechanical protection against foreign matters, casual impacts, etc.

In the back of shell 2 the sealing is obtained by a cap nut 37 screwed into internal thread 42 of shell 2. A gasket 44, which assures the sealing with the internal wall of shell 2, is placed in a groove 43 in cap 37. Cap 37 is formed by two disk-shaped plates 38 and 39. Internal plate 38 houses gasket 44 while outer plate 39 is threaded.

These two plates 38 and 39 are coupled to each other through a cylindrical connection 40, whose diameter is suitably less than the shell 2 diameter, so that when cap 37 is screwed into shell 2 a ring-shaped space 45 is formed between cap 37 and shell 2.

Space 45 opened to outer space by means of radial holes 54 and axial hole 53 is therefore at atmospheric pressure.

Four pins 46, shrouded in insulating sleeves 47, cross plate 38, and have one of their ends project into space 45 while the other end of each pin 46 projects into the inner space 48 of the measuring head.

Feeding and detecting wires 50 of the transducer 19 are welded to the end of pins 46 projecting toward the interior of the measuring head.

On the opposite ends of pins 46 other wires 51 are welded, which connect head 1 to a feeding and detecting instrument 52.

The use of pins 46 and insulating sleeves 47 avoids the leakage of the fluid contained in space 48, as explained herebelow.

Wires 51 lead out of measuring head 1 through an axial hole 53 made through plate 37 and two radial holes 54 made through cylindrical connection 40. Internal space 48 of head 1, whose sealing is assured by gaskets 33, 34, 35 and 44 and by sleeves 47, is filled with silicone fluid, having the required viscosity, through holes 26 and 27 which are then kept closed by screws 24 and 25.

The silicone fluid is liquid constituted by organic-siliceous derivatives, and available on the market.

In the attached drawing head 1 is shown in a measuring position on the hole 60 surface of a workpiece 62, while the hole surface is ground by a grinding wheel 63.

Feelers 15 and 16 contact the hole surface owing to the arms 7 and 8 rotation around fulcra 22.

Arms 7 and 8 are suitably shaped in order to present, within space 48, large facing surfaces. In this way the fluid volume, displaced by the arms, is relatively large and therefore it is possible to obtain a very effective damping, which permits the precision measurement of grooved holes too.

The good damping characteristics of the above described head permit an advantageous utilization also in machinings where the grinding wheel and the measuring head move into and out of the hole to be measured (i.e., reciprocating grinding).

The measuring heads used in such workings are generally provided with devices that reduce the feelers opening when the latter go out of the hole, and then release them again when going back into the hole ("retraction"). The head damping according to the present invention assures that the feelers get well in touch again with the hole surface. It is often advisable to have a higher damping in one of the two displacement directions of the feelers.

An asymmetric shape of the moving parts contained in space 48, i.e., of mobile arms 7 and 8 and of elements 17 and 18 of transducer 19, permits this result.

For this purpose, it is possible to use, for example, concave surfaces or fins, placed according to their own displacement direction, where a higher damping is required.

To vary the damping (in the two directions, of opening and approaching), it is necessary to empty space 48 and fill it with a silicone fluid having different viscosity.

On the market there are silicone fluids of very many different viscosity indexes, which can be mixed to thereby vary the damping in a continuous way, over a very large range. The use of silicon fluids has been found much more advantageous than the use of mineral oils, because the former assure constant damping factors under the most different working conditions, while not damaging but protecting the components inside the head, in particular the gaskets and the electrical parts, which are the most delicate elements.

The replacement operation of the silicone fluid is very simple and does not require the creation of a vacuum in space 48. This is a very important advantage.

In conventional gages it is necessary to create vacuum in the damper cylinders, because the damping is due to oil leakage and therefore may vary considerably due to the presence of air bubbles in the oil.

In the gages according to the present invention the damping is due to the mobile elements paddling, which is not remarkably influenced by possible air bubbles.

The use of protecting membrane 36 is very important too. It has preferably a honeycomb structure, very yielding but at the same time strong against impacts, and prevents gaskets 33 and 34 from damage caused by possible explosions of wheel 63.

This invention permits the construction of very small gages provided with suitably damped moving elements which can produce measurements having a precision never reached before.

In fact the shell 2 diameter may be shorter than 30 mm, thus permitting the housing of the gage even when the space available is very small, as often happens, in particular for internal grinding machines, wherein the gage must be housed in the work spindle.

Obviously, in addition to the embodiment shown other variants and modifications can be made equivalent from a functional and structural point of view, without leaving the scope of the invention. For example, it is evident that this invention may be applied to single feeler gages and to gages for the measurement of external sizes.

What is claimed is:

1. Gage for the measurement of the sizes of moving workpieces comprising: an outer casing defining an internal chamber and first and second passage surfaces connecting the internal chamber with the space outside the casing; support means located in said chamber and fixed to the casing; at least one mobile arm supported by the support means, said arm including a first section located in said chamber and a second section, projecting outside said casing through said first passage surfaces; a feeler fixed to said second section for contacting the workpieces to be measured; a measuring transducer coupled to said mobile arm, said transducer including an element fixed to said first section of the arm; supply and detecting means for said transducer; connecting means for connecting the tranducer to the supply and detecting means, said connecting means passing through said second passage surfaces; first sealing means for sealing said first passage surfaces while permitting the movement of said mobile arm; second sealing means for sealing said second passage surfaces; a viscous fluid filling said internal chamber; and wherein said first section and said transducer element have large facing surfaces adapted to displace a quantity of viscous fluid, upon movements of the arm, to obtain a damping effect on the arm, due substantially to paddling action, for permitting the measurement of workpieces having discontinuous surfaces and measurements involving an intermittent contact between said feeler and the workpiece.

2. The gage according to claim 1, wherein said arm is movable in opposite directions and wherein said shape is asymmetric to obtain a damping effect variable depending on the displacement direction of the arm.

3. The gage according to claim 1, wherein said second sealing means comprises insulating sleeves coupled to said second passage surfaces and said connecting means comprises conducting pins shrouded in the insulating sleeves and wires connected to the conducting pins.

4. The gage according to claim 1, wherein said viscous fluid is a silicone fluid.

5. Gage for the measurement of the sizes of moving workpieces comprising: an outer casing defining an internal chamber and at least first, second and third passage surfaces connecting the internal chamber with the space outside the casing; support means located in said chamber and fixed to the casing; two movable arms pivotally supported by said support means, each arm including a first section located in said chamber and a second section projecting outside said casing through said first and second passage surfaces, respectively; two feelers fixed to the sections of the arms projecting outside the chamber, for contacting the workpieces to be measured; measuring transducer means coupled to the arms, said transducer means including mobile elements fixed to the first sections of the arms; supply and detecting means for said transducer means; connecting means for connecting the transducer means to the supply and detecting means, said connecting means passing through the third passage surfaces; first means for sealing said first and second passage surfaces while permitting the pivotal movements of said arms; second means for sealing said third passage surfaces; a viscous fluid filling said internal chamber for providing a damping effect on the movements of the movable arms to permit the measurement of workpieces having discontinuous surfaces and measurements involving an intermittent contact between said feelers and the workpieces; and wherein said first sections of the movable arms and said mobile elements of the transducer means have large facing surfaces so as to displace, upon the movements of the arms, a sufficient quantity of fluid to obtain, by the cooperation with the fluid, substantially due to paddling action, said damping effect.

6. The gage according to claim 5, wherein said viscous fluid is a silicone fluid.

7. The gage according to claim 6, wherein said casing defines fourth passage surfaces for filling and replacing said silicone fluid and wherein the casing comprises plug means to close said fourth passage surfaces.

8. A gage for the measurement of internal diameters of workpieces being machined on internal grinding machines, comprising: an outer casing defining an internal chamber, said casing including a cylindrical shell, a front plate fixed to the shell and a rear cap fixed to the shell, the front plate defining two openings and the rear cap defining passage surfaces, said openings and passage surfaces connecting said chamber with the outside of said casing; support means located in said chamber and fixed to the casing; two measuring arms pivotally mounted on said support means, each arm including a first section and a second section, the first sections being located in said chamber and the second sections projecting outside said casing through said openings; two feelers fixed to said second sections, respectively; a measuring transducer including two elements fixed to said first sections, respectively; supply and detecting means for said transducer; connecting wires for connecting the transducer with the supply and detecting means, said connecting wires passing through said passage surfaces; gasket means for sealing said openings while permitting movements of said arms; sealing means for sealing said passage surfaces; a viscous fluid filling said internal chamber; and a protecting, yielding membrane fixed to the casing and located before the front plate to mechanically protect said gasket means and wherein said first sections and said two elements define large facing surfaces for displacing, upon pivotal movement of the arms, a volume of viscous fluid sufficient to obtain, substantially through a paddling action, a damping effect on the arm movements occurring in the measurement of workpieces having discontinuous surfaces and in measurements involving an intermittent contact between said feelers and the workpieces.

9. The gage according to claim 8, wherein said large facing surfaces define fins.

* * * * *